July 11, 1967  E. L. LAGERSTROM  3,330,507
QUICK-DISCONNECT FOR EJECTION SEAT
Filed Jan. 4, 1966
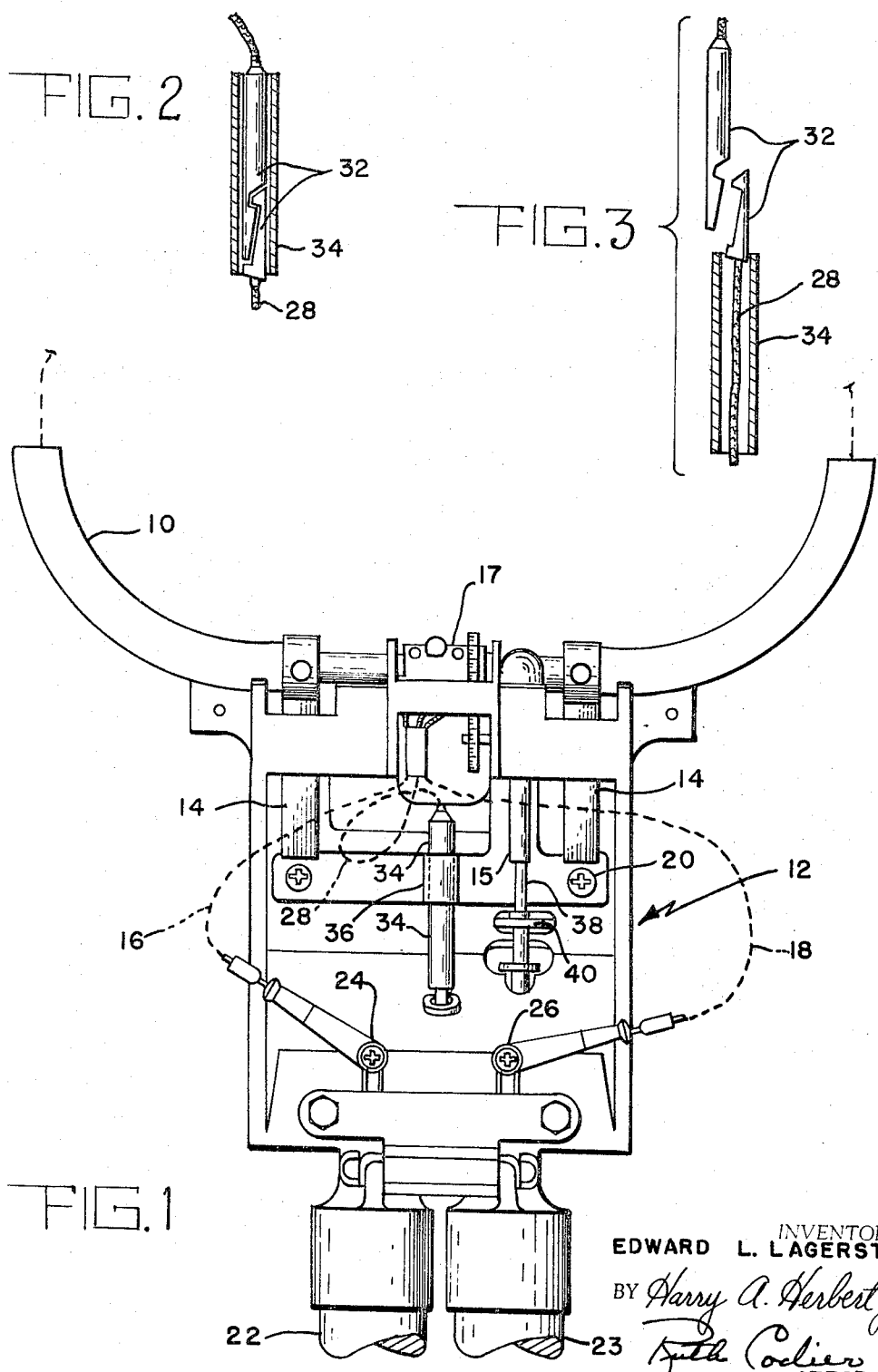
INVENTOR.
EDWARD L. LAGERSTROM

United States Patent Office 3,330,507
Patented July 11, 1967

3,330,507
QUICK-DISCONNECT FOR EJECTION SEAT
Edward L. Lagerstrom, 1426 W. Ave. H-15,
Lancaster, Calif. 93534
Filed Jan. 4, 1966, Ser. No. 518,737
4 Claims. (Cl. 244—122)

The invention described herein may be manufactured and used by or for the United States Government for governmental purposes without payment to me of any royalty thereon.

The present invention relates to an ejection seat quick-release device, and more particularly, to a fast-acting and positive release type of locking mechanism which forms an integral part of an ejectable seat apparatus, and wherein the D-ring pull cord which initiates the ejection sequence is itself severed from the seat.

Serious and sometimes fatal injury has resulted in ejections of crewmen from aircraft when the separation of the crew member from the ejection seat did not occur or was delayed. In many cases, this delayed separation has been traced to the failure of the crewman for one reason or another to perform all of the operations necessary to release him from the seat after ejection has occurred. The tendency of the pilot under ejection stress conditions to hold onto the seat or to hold onto the D-ring which he pulls to initiate the ejection sequence jeopardizes his complete and successful separation.

Furthermore, slowness in release has been one of the hampering factors in locking devices used to lock ejection seats to the air or spacecraft. If this condition were removed, and an operator could be assured that once he had locked his ejection seat in place, that its complete release would be fast and efficient, a great deal of reluctance on the part of pilots to adjust these locks would be removed.

Furthermore, during the separation of the man from the seat, there may not be sufficient distance achieved to avoid disastrous encounters with it. The man may be injured by his encounter with the seat or his parachute system may become entangled with it.

The object of the present invention is to eliminate as many of these hazardous conditions as possible. In the device of the invention, the entire ejection sequence is initiated by a single pull on the D-ring. The sequence includes, seat ejection, severance of man from seat, canopy deployment and severance of parachute from the operator when he lands. In addition, the sequence which is begun when the D-ring is pulled will, by virtue of the present invention, include severance of the D-ring also. A release device is provided such that when the D-ring is pulled by the operator to initiate the entire ejection sequence, the D-ring is separated from the seat and may be carried away in the operator's hand without harmful results. The device of the invention makes it impossible for the operator to hold onto any portion of the seat.

A still further object of the invention is the provision of a device which can be installed on existing standard equipment, such as the F104 ejection seat and without major modification.

These and other advantages, features and objects of the invention will become more apparent from the following description taken in connection with the illustrative embodiments in the accompanying drawings, wherein:

FIGURE 1 is a top plan view of the device according to the invention;

FIGURE 2 is a detailed view of the quick-disconnect before ejection; and

FIGURE 3 is a detailed view of the quick-disconnect after ejection.

Referring more in detail to the drawings, a D-ring 10, available to the airman is held in a retainer assembly 12 which is secured to the ejection seat. The D-ring 10 is the primary control for initiating the entire ejection sequence.

A pair of wedge members 14 are attached to the D-ring, are a part of it, and separate from the seat with it. Attached also to the lower side of the D-ring is a plunger or safety pin 15, and a block 17 to which operating cables of the ejection sequence are attached.

The wedges 14 serve the double function of guide for the installation of the D-ring during the assembly operation and serve also to retain the D-ring in the retainer assembly 12. Spring latches, sears or other form of severable connection 20 located in a bar or yoke 21, in the retainer assembly 12, engage notches in the lower ends of the wedge members 14 retaining the D-ring 10 in proper position. These elements are severed from the retainer 12 and go with the D-ring 10.

Three cables are attached to the D-ring through the block 17. All of these are attached to initiators which initiate the various functions in the seat ejection sequence, and the entire ejection sequence is initiated by a single pull on the D-ring 10.

In the ejection devices now in use, one example being the rocket catapult used on the ejection seat of the F104, the cables 16 and 18 which fire the ballistics initiators 22 and 23 are attached to the initiators through severable latches or sears 24 and 26. These cables separate with the D-ring when the function of firing is completed.

A secondary system is operated by a third and central cable 28. As presently constructed, this is a solid cord which wraps around a spring loaded drum mounted on a forward torque tube. This construction is prior art and is not shown here.

The invention in the present case provides a means whereby this cable is divided after its function of rotating the torque shaft (not shown) and loading the springs therein has been completed, so that the upper portion of it falls away with the D-ring. The crewman, by pulling the D-ring initiates the entire ejection process, including the severance of the D-ring itself from the ejection seat. The two elements of a latch 32 (shown in FIGURES 2 and 3) are secured each to one portion of the divided cable 28. As the D-ring is assembled, the cable 28 is threaded through a sleeve 34 held in place against movement by a second sleeve 36 provided in the yoke or bar 21. The sleeve 34 holds the members of the latch 32 together and keeps the cable 28 intact until its function is performed. As the latch 32 is lifted out of the sleeve 34, the cable 28 divides.

A safety device is provided against any inadvertent rotation of the torque shaft so that accidental or untimely firing of the initiators which are actuated by rotation of the torque shaft is prevented. As has been noted, a plunger or safety pin 15 is attached to the D-ring 10.

The pin 15 engages a second pin 38 which is depressed when the D-ring is installed and engages in an opening in a link 40 which is part of a latch mechanism (not shown) which prevents rotation of the torque shaft. This device locks or safeties the entire forward torque shaft.

It is to be understood that modification of the device as above described may be made within the scope of the appended claims.

I claim:
1. An initiator for an ejection sequence comprising a retainer frame, a D-ring severably attached to said frame, a pair of cables attached to said D-ring, each for firing a primary ballistic initiator for performing functions in said ejection sequence, sears for severing said cables from said retainer frame when the function of firing said ballistic initiators has been performed, a third cable attached to said D-ring, said third cable operating to load the spring of a torque bar for initiating a secondary sequence, and means for dividing said third cable to completely release said D-ring from said retainer frame.

2. A device as set forth in claim 1 wherein said means comprises interengaging elements of a severable latch introduced in said third cable for dividing said cable, means for retaining said severable elements in latched condition to maintain said third cable as an intact operating unit, said means comprising a sleeve secured to said frame and containing the severable elements of said latch, said severable elements separating to divide said cable when said latch is lifted out of said sleeve by a pull applied to said D-ring.

3. A quick release device in an ejection sequence for completely freeing a flier from his ejection seat, said device comprising a D-ring operable by said flier to initiate the entire ejection sequence, a pair of cables attached to said D-ring for firing primary ballistics initiators, severable sears attaching each of said cables to corresponding primary initiators, a third cable attached to said D-ring for operating the torque bar of a secondary initiator system, and means for dividing said third cable to completely sever the D-ring from said seat after the function of said third cable has been accomplished.

4. A device as set forth in claim 3 wherein said dividing means comprises a latch, engageable elements of said latch attached to each divided end of said cable to render said cable operable as an undivided unit, and means for retaining the elements of said latch in engagement, said retaining means comprising a sleeve secured to a retainer frame, the elements of said latch separating when said D-ring is pulled a sufficient amount to withdraw said latch from said sleeve.

References Cited

UNITED STATES PATENTS 2,924,405    2/1960    Dalglish et al. _____ 244—122

MILTON BUCHLER, *Primary Examiner.*

B. BELKIN, *Assistant Examiner.*